United States Patent
Venkatesan et al.

(10) Patent No.: US 6,920,873 B2
(45) Date of Patent: Jul. 26, 2005

(54) PORTABLE HEATING PACK

(75) Inventors: Srinivasan Venkatesan, Southfield, MI (US); Krishna Sapru, Troy, MI (US); Boyko Aladjov, Rochester Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/660,252

(22) Filed: Sep. 11, 2003

(65) Prior Publication Data

US 2005/0056269 A1 Mar. 17, 2005

(51) Int. Cl.$^7$ .................................................. F24J 1/00
(52) U.S. Cl. .............................. 126/263.05; 126/263.06
(58) Field of Search ....................... 126/263.01, 263.05, 126/263.06; 252/70

(56) References Cited

U.S. PATENT DOCUMENTS 4,142,508 A * 3/1979 Watson ................. 126/263.07

* cited by examiner

Primary Examiner—Jiping Lu
(74) Attorney, Agent, or Firm—Frederick W. Mau, II; Marvin S. Siskind

(57) ABSTRACT

A portable heating pack utilizing a supercorroding metallic alloy that produces heat and gaseous hydrogen upon contacting a corroding liquid. The portable heating pack provides for the consumption and/or storage of the gaseous hydrogen rather than venting the gaseous hydrogen from the portable heating pack.

9 Claims, 2 Drawing Sheets

# PORTABLE HEATING PACK

FIELD OF THE INVENTION

The present invention generally relates to portable heating packs. More particularly, the present invention relates to portable heating packs utilizing exothermic reactions to provide heat, which may be used to heat meals and beverages or provide heat for other uses.

BACKGROUND

In the past, portable heat packs have found many uses including, but not limited to, providing heat for food preparation, medical treatments, and comfort in remote locations. For food preparation, the portable heating pack should be able to cook the food relatively quickly, while not overcooking or undercooking the food. The heating mechanism utilized by the portable heating pack should also be relatively cheap, environmentally and consumer-wise safe, and be fail-proof. The portable heating packs are typically self contained, self heated packs which provide heat from exothermic reactions carried out within the heating pack. In many cases the portable heating packs utilize a water reactive chemical compound which produces heat via a hydrolysis reaction upon contacting water. Other portable heating packs have used chemical/electrochemical reactions such as corrosion of a metal such as magnesium or iron to produce heat.

U.S. Pat. Nos. 3,079,911 and 5,205,277 discloses the use of calcium oxide (quick lime) in a portable heating pack. Water is added to the portable heating pack and reacts with the calcium oxide to form calcium hydroxide and heat. The drawback of this type of system is that the heat of hydrolysis of the calcium oxide can be large and somewhat uncontrollable to be useful.

The corrosion of a magnesium/iron alloy has worked particularly well for use in portable heating packs and has been the subject of multiple U.S. patents. U.S. Pat. Nos. 4,522,190, 5,220,909, and 5,355,869 disclose the use of a supercorroding alloy of magnesium and iron in a portable heating device, termed "Flameless Ration Heaters" (FRH), used for heating food. FRH devices are widely produced and utilized each year. A typical FRH weighs approximately ½ ounce and can raise the temperature of an 8 ounce entree 100° F. in 10 minutes. The FRH has been found superior to other types of portable heating packs in regards to cost, safety and performance, however, during operation each FRH releases approximately 8 liters of hydrogen which is vented to the atmosphere.

In the FRH, a magnesium/iron alloy is brought into contact with water or an ionically conducting solution, which corrodes the alloy thereby producing heat. The reaction of magnesium and water is relatively slow due to the formation of an oxide/hydroxide coating on the surface of the magnesium, however, the addition of iron to the magnesium has been found to accelerate the reaction. The amount of iron can be varied to control the rate of reaction thereby controlling the amount of heat produced. The reaction between magnesium and water is actually an electrochemical reaction where the anodic corrosion of magnesium is supported by the cathodic hydrogen evolution taking place on the iron. While this reaction works particularly well for providing a controlled amount of heat, a side product of the reaction is flammable and potentially explosive hydrogen gas. During normal use the amount of hydrogen produced may not reach the lower explosive limit (LEL) for hydrogen in air, but in confined quarters where one or more of the portable heating devices are used simultaneously, lower explosive limits (LEL) may be reached. By minimizing or safely collecting and storing the hydrogen produced by the FRH, the safety of the FRH will be improved thus making the FRH suitable for use in confined quarters and additional applications.

SUMMARY OF THE INVENTION

A first embodiment of the present invention discloses a portable heating pack comprising a supercorroding metallic alloy adapted to produce heat and gaseous hydrogen upon contacting a corroding liquid, and a hydrogen storage material adapted to absorb the gaseous hydrogen produced as a product of the corrosion of the supercorroding metallic alloy. The supercorroding metallic alloy may be a magnesium-iron alloy or any other alkali or alkaline earth alloys, such as calcium and lithium alloys, that are adapted to produce heat and hydrogen upon contacting a corroding fluid. The supercorroding metallic alloy is disposed in a container adapted to receive the corroding liquid and allow the corroding liquid to contact the supercorroding metallic alloy. The hydrogen storage material may be disposed in the container with the supercorroding metallic alloy whereby the hydrogen storage material is in communication with the gaseous hydrogen. The hydrogen storage material may be intimately mixed with the supercorroding metallic alloy. The hydrogen storage material may also be disposed in a hydrogen storage vessel in gaseous communication with the container. The hydrogen storage material may be selected from $AB$, $A_2B$, $AB_2$, or $AB_5$ type alloys. Examples of such alloys are Mg alloy systems, Mg—Ni alloy systems, Mg—Cu alloy systems, Ti—Fe alloy systems, Ti—Mn alloy systems, Ti—Ni alloy systems, Ti—V alloy systems, Ti—Cr alloy systems, Mm-Ni alloy systems, Mm-Co alloy systems, or combinations thereof.

The portable heating pack may further comprise an oxide material adapted to consume the gaseous hydrogen via a reduction reaction, whereby the oxide material is in gaseous communication with the gaseous hydrogen. The supercorroding metallic alloy may be a magnesium-iron alloy or any other alloy adapted to produce heat and hydrogen upon contacting a corroding fluid. The oxide material adapted to consume said gaseous hydrogen may be intimately mixed with the supercorroding metallic alloy powder. The hydrogen consuming oxide material may be an oxide of one or more metals selected from copper, silver, manganese, nickel, sodium, zinc, cadmium, or mercury.

A second embodiment of the present invention discloses a portable heating pack comprising a supercorroding metallic alloy adapted to produce heat and gaseous hydrogen upon contacting a corroding liquid, and an oxide material adapted to consume said gaseous hydrogen via a reduction reaction. The hydrogen consuming oxide material may be intimately mixed with said supercorroding metallic alloy powder. The hydrogen consuming oxide material may be an oxide of one or more metals selected from copper, silver, manganese, nickel, zinc, cadmium, or mercury.

DETAILED DESCRIPTION OF THE INVENTION

The present invention discloses a portable heating pack utilizing a supercorroding metallic alloy powder that corrodes upon contact with a corroding liquid to provide a controlled amount of heat. Hydrogen produced as a side product of the corrosion of the supercorroding metallic alloy powder is consumed and/or collected and stored in a safe unreactive form rather than being vented out of the portable heating pack.

Figure 1:
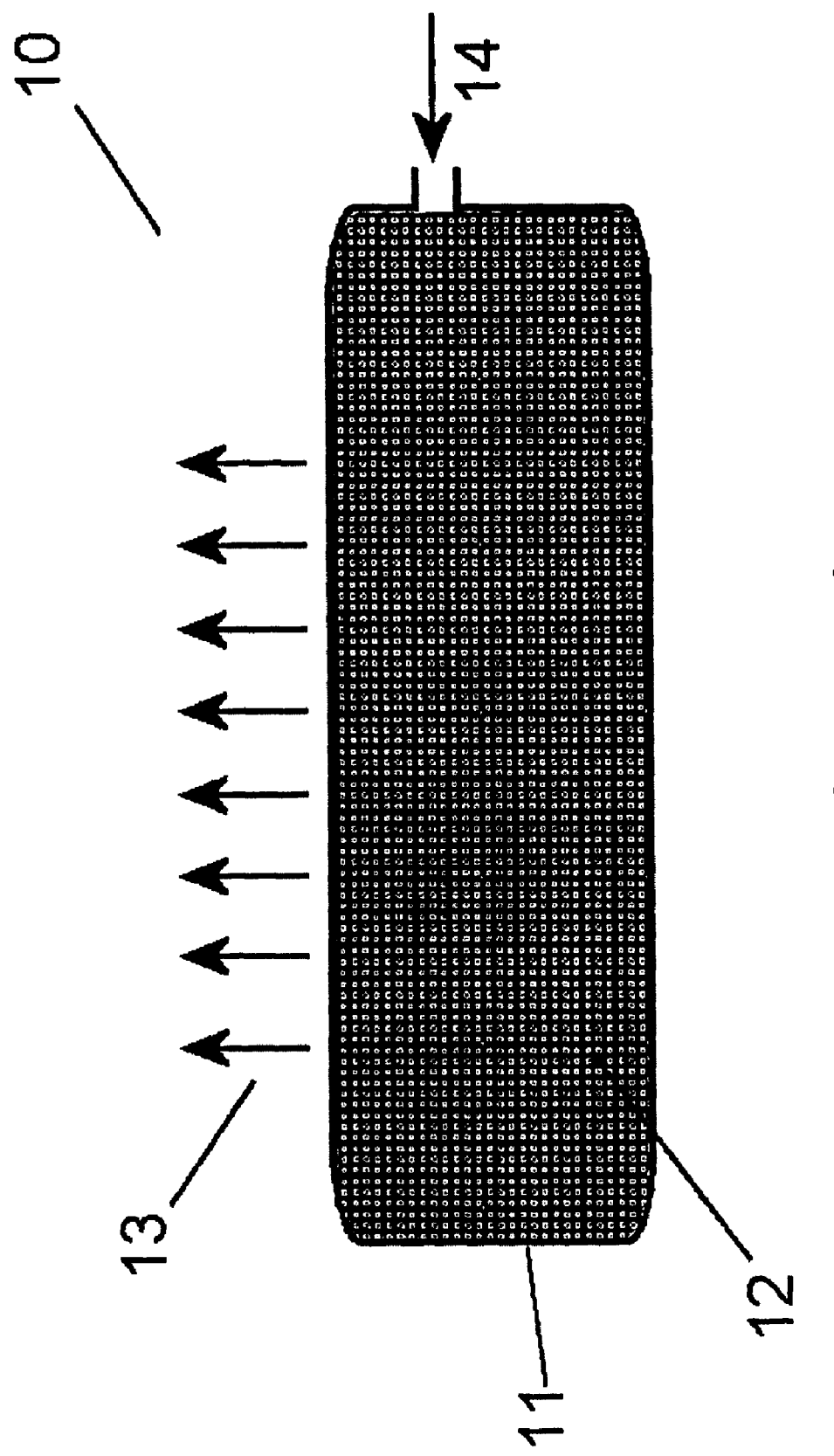
FIG. 1, shows a depiction of a first embodiment of the portable heating pack in accordance with the present invention.

A first embodiment of a portable heating pack in accordance with the present invention is shown in FIG. 1. The portable heating pack 10 comprises a container 11 with a supercorroding metallic alloy powder 12 disposed therein. The supercorroding metallic alloy powder 12 is adapted to corrode and provide heat 13 upon contacting a liquid 14, preferably water. The portable heating pack further comprises a material adapted to consume hydrogen and/or a hydrogen storage material intimately mixed with the supercorroding metallic alloy powder. The container is adapted to receive a liquid 14 corrosive to the supercorroding metallic alloy powder and allow the corrosive liquid to contact and corrode the supercorroding metallic alloy. The corrosive liquid 14 may be water or an electrolyte solution. Materials adapted to activate the supercorroding metallic alloy powder may also be included in the corrosive liquid where the supercorroding metallic alloy powder is unactivated as a safety precaution. To allow the corrosive liquid 14 to better contact the supercorroding metallic alloy powder 12, the supercorroding alloy powder may be affixed to a matrix material or support. The matrix material or support may be thermally conductive to provide increased thermal conductivity between the contents and the exterior heating surface of the portable heating pack. The container 11 is preferably constructed from materials that are unreactive with the environment within the container and are capable of withstanding temperatures and pressures present within the container during operation of the portable heating pack. The container 11 is preferably constructed from thermally conductive metals or polymers allowing substantially all of the heat produced within the container to be transferred to the container exterior. The container 11 may also be designed to focus the heat produced inside the container to a specific area of the container exterior. The container may also be rigid or flexible depending on the application.

Figure 2:
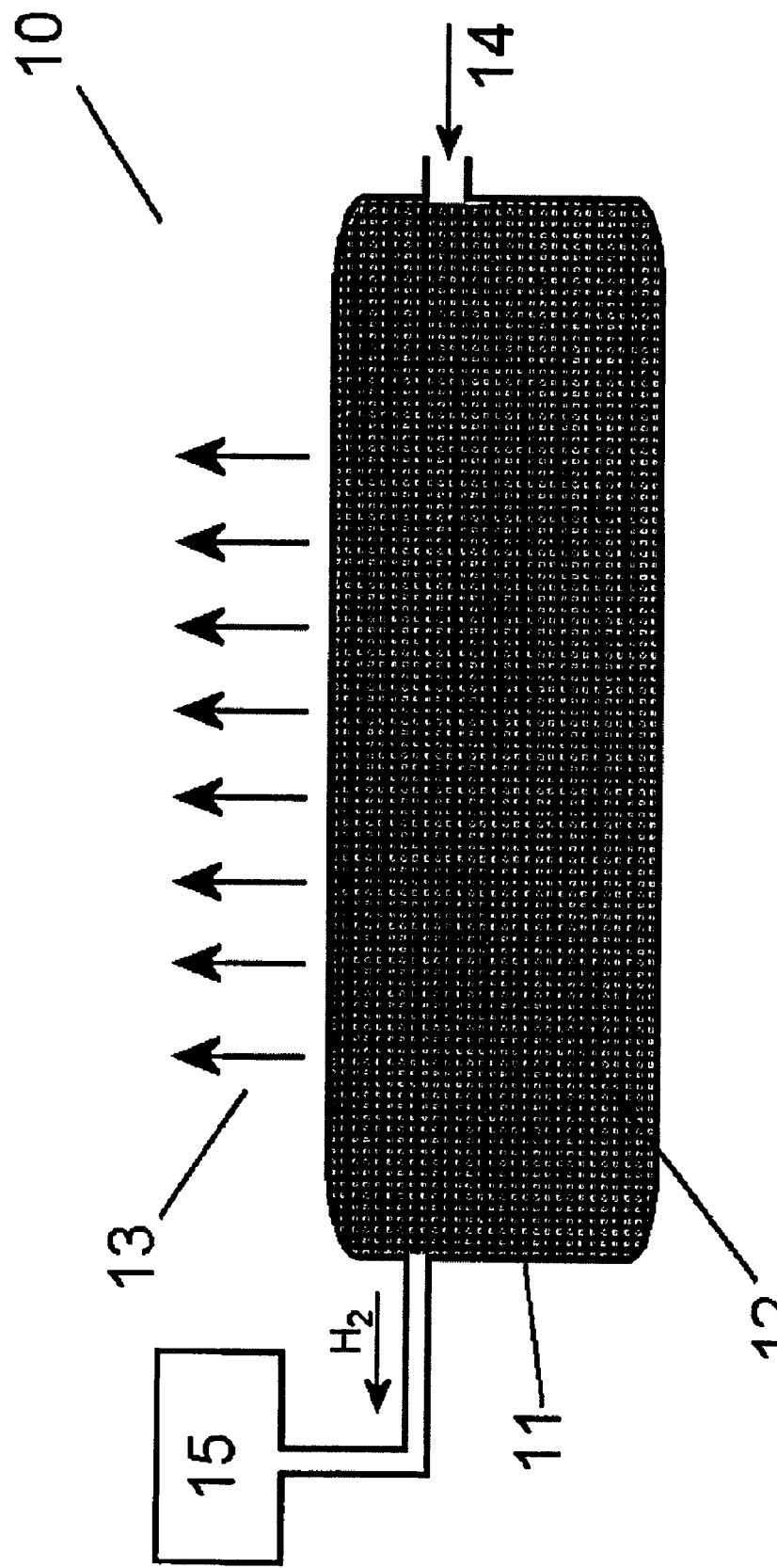
FIG. 2, shows a depiction of a second embodiment of the portable heating pack in accordance with the present invention.

A second embodiment of the present invention is shown in FIG. 2. The portable heating pack 10 in accordance with the second embodiment of the present invention comprises a container 11 with a supercorroding metallic alloy powder 12 disposed therein, and a metal hydride hydrogen storage vessel 15, the hydrogen storage vessel 15 being in gaseous communication with the container. 11. The portable heating pack 10 may further include a hydrogen consuming oxide material adapted to consume hydrogen produced upon corrosion of the supercorroding alloy powder in the container. Preferably, the hydrogen consuming oxide material is intimately mixed with the supercorroding alloy powder. In this embodiment, the hydrogen produced from the corrosion of the supercorroding alloy powder is absorbed by the hydrogen storage alloy utilized in the metal hydride hydrogen storage vessel and/or allowed to react with the oxide thus eliminating the danger of accumulated hydrogen gas release.

The container 11 is adapted to receive a liquid corrosive to the supercorroding metallic alloy powder and allow the corrosive liquid 14 to contact and corrode the supercorroding metallic alloy 12. The corrosive liquid 14 may be water or an electrolyte solution. Materials adapted to activate the supercorroding metallic alloy powder 12 may also be included in the corrosive liquid 14. To allow the corrosive liquid 14 to better contact the supercorroding metallic alloy powder 12, the powder may be affixed to a matrix material or support. Upon entering the container 11, the corroding liquid contacts the supercorroding metallic alloy powder.

The supercorroding metallic alloy powder begins to corrode resulting in the production of heat 13 and hydrogen gas. Heat is transferred to the exterior of the portable heating pack while the hydrogen produced as a result of the corrosion is consumed by the hydrogen consuming oxide material and/or transferred to the hydrogen storage vessel and stored in hydride form.

The hydrogen storage vessel 15 is adapted to receive and store hydrogen produced as a result of the corrosion of the supercorroding metallic alloy powder 12 in the first container in metal hydride form. The hydrogen storage vessel 15 may be positioned inside or outside of the container. The absorption of gaseous hydrogen by the hydrogen storage alloy is accompanied by heat generation. The heat produced by the absorption of hydrogen into the hydrogen storage alloy may be used as a secondary source of heat within the heating pack. Alternately, the production of heat of hydride formation may result in a smaller amount of the supercorroding alloy being used within the portable heating pack. Once the hydrogen storage material stored in the hydrogen storage vessel becomes fully hydrided, the hydrogen storage vessel may be removed and replaced with a hydrogen storage vessel having an unhydrided hydrogen storage material stored therein. The hydrogen storage vessel having the hydrided hydrogen storage alloy stored therein may be used as a source of hydrogen for hydrogen fueled applications.

The container and the hydrogen storage vessel are preferably constructed from materials that are unreactive with the environment present within the portable heating pack and are capable of withstanding temperatures and pressures present within the portable heating pack during operation. The addition of 5 to 15 weight percent of a heat conducting high surface area carbon, while not interfering with the heat producing reaction, will aid in dissipating the heat more uniformly by virtue of the high surface area and inherent black body radiation characteristics of the carbon. The container is preferably constructed from thermally conductive metals or polymers allowing substantially all of the heat produced within the first container to be transferred to the exterior of the portable heating pack. The container may also be designed to focus the heat produced inside the container to a specific area of the portable heating pack exterior. The container may also be rigid, flexible, or designed to fit any contour desired depending on the application.

The material adapted to consume hydrogen within the portable heating pack may be an oxide material that will become reduced in the presence of hydrogen thereby consuming hydrogen to form water. Materials which work well to consume hydrogen through a reduction reaction are metal oxides having a diatomic bonding strength weaker than the strength of a hydrogen-oxygen bond. Such materials must also have fast kinetics for the reduction reaction. The oxide materials may be selected from copper oxide, silver oxide, manganese oxide, zinc oxide, cadmium oxide, mercuric oxide, or other oxides capable of reduction in the presence of hydrogen. A secondary benefit of the hydrogen consuming oxide materials is that the product of the oxide reaction is typically a metal in a finely divided form. Upon exposure to air, the oxygen from the air will react with the finely divided metal to produce the oxide and generate heat which will also be available for the desired application.

The hydrogen storage material as utilized in the portable heating pack should be unreactive with the supercorroding metallic alloy and be substantially poison resistant upon exposure to air during removal of the hydrogen storage material from the heating pack. The hydrogen storage material should also be activated prior to use in the portable heating pack, and not reactive with the materials contained in and added to the heating pack. The hydrogen storage material is preferably a reversible hydrogen storage alloy which provides for the reversible absorption and desorption of hydrogen. Reversible hydrogen storage alloys may be chosen from AB, $A_2B$, $AB_2$, or $AB_5$ alloy systems, or combinations thereof. Examples of such alloys are Mg, Mg—Ni, Mg—Cu, Ti—Fe, Ti—Mn, Ti—Ni, Ti—V, Ti—Cr, Mm-Ni, Mm-Co alloy systems. The different hydrogen storage alloy systems provide differing characteristics such as hydrogen absorption capacity and reversibility based on temperature and pressure.

Of these materials, the Mg alloy systems can store relatively large amounts of hydrogen per unit weight of the storage material. To release the hydrogen stored within the alloy heat energy must be supplied, because of the low hydrogen dissociation equilibrium pressure of the alloy at room temperature. Moreover, release of hydrogen can be made, only at a high temperature of over 250° C. along with the consumption of large amounts of energy. Different types of magnesium based hydrogen storage alloys are fully disclosed in U.S. Pat. No. 6,193,929, to Ovshinsky et al. entitled "High Storage Capacity Alloys Enabling A Hydrogen-Based Ecosystem", the disclosure of which is hereby incorporated by reference.

The rare-earth (Misch metal) alloys typically can efficiently absorb and release hydrogen at room temperature, based on the fact that it has a hydrogen dissociation equilibrium pressure on the order of several atmospheres at room temperature. The drawbacks to rare earth alloys are that their hydrogen-storage capacity per unit weight is lower than any other hydrogen-storage materials and they are relatively expensive.

The Ti—Fe alloy system, which has been considered as a typical and superior material of the titanium alloy systems, has the advantages that it is relatively inexpensive and the hydrogen dissociation equilibrium pressure of hydrogen is several atmospheres at room temperature. However, since it requires a high temperature of about 350° C. and a high pressure of over 30 atmospheres for initial hydrogenation. Also, it has a hysteresis problem which hinders the complete release of hydrogen stored therein. The Ti—Fe alloy is also easily poisoned by moisture, which will be present within the heating pack.

The Ti—Mn alloy has excellent ambient temperature kinetics and plateau pressures. The Ti—Mn alloy system has been reported to have a high hydrogen-storage efficiency and a proper hydrogen dissociation equilibrium pressure, since it has a high affinity for hydrogen and low atomic weight to allow large amounts of hydrogen-storage per unit weight.

A generic formula for the Ti—Mn alloy is: $Ti_{Q-X}Zr_XMn_{Z-Y}A_Y$, where A is generally one or more of V, Cr, Fe, Ni and Al. Most preferably A is one or more of V, Cr, and Fe. The subscript Q is preferably between 0.9 and 1.1, and most preferably Q is 1.0. The subscript X is between 0.0 and 0.35, more preferably X is between 0.1 and 0.2, and most preferably X is between 0.1 and 0.15. The subscript Y is preferably between 0.3 and 1.8, more preferably Y is between 0.6 and 1.2, and most preferably Y is between 0.6 and 1.0. The subscript Z is preferably between 1.8 and 2.1, and most preferably Z is between 1.8 and 2.0. The alloys are generally single phase materials, exhibiting a hexagonal Laves phase crystalline structure.

The supercorroding metallic alloy powder is preferably a magnesium/iron alloy. The supercorroding metallic alloy may further include activation materials which allow the supercorroding metallic alloy to immediately react upon contacting water. Where the activation materials are initially omitted from the supercorroding metallic alloy, the activation materials are added to the supercorroding metallic alloy prior to use. Initially omitting the activation materials from the supercorroding alloy is performed as a safety precaution to prevent premature corrosion of the supercorroding alloy upon exposure to water. Examples of supercorroding powders such as a magnesium/iron powder are described in detail in U.S. Pat. No. 4,522,190 to Kuhn et al. and in U.S. Pat. No. 5,117,809 to Scaringe et al., the disclosures of which are hereby incorporated by reference.

While the invention has been described in connection with preferred embodiments and procedures, it is to be understood that it is not intended to limit the invention to the described embodiments and procedures. On the contrary it is intended to cover all alternatives, modifications and equivalents which may be included within the spirit and scope of the invention as defined by the claims appended hereinafter.

What is claimed is:

1. A portable heating pack comprising:

a supercorroding metallic alloy powder disposed within said portable heating pack, said supercorroding metallic alloy powder producing heat and gaseous hydrogen upon contacting a corroding liquid;

a hydrogen storage material for absorbing and storing said gaseous hydrogen and/or an oxide material for consuming said gaseous hydrogen via a reduction reaction said hydrogen storage material and/or said oxide material being in gaseous communication with said supercorroding metallic alloy powder; and means for contacting said supercorroding metallic alloy powder with a corroding liquid.

2. The portable heating pack according to claim 1, wherein said portable heating pack further comprises means for conducting heat produced within said portable heating pack to the exterior of said portable heating pack.

3. The portable heating pack according to claim 1, wherein said supercorroding metallic alloy is a magnesium-iron alloy.

4. The portable heating pack according to claim 1, wherein said hydrogen storage material is intimately mixed with said supercorroding metallic alloy.

5. The portable heating pack according to claim 1, wherein said hydrogen storage material is selected from AB, $A_2B$, $AB_2$, or $AB_5$ type alloys.

6. The portable heating pack according to claim 1, wherein said hydrogen storage material is selected from Mg alloy systems, Mg—Ni alloy systems, Mg—Cu alloy systems, Ti—Fe alloy systems, Ti—Mn alloy systems, Ti—Ni alloy systems, Ti—V alloy systems, Ti—Cr alloy systems, Mm-Ni alloy systems, Mm-Co alloy systems, or combinations thereof.

7. The portable heating pack according to claim 1, wherein said oxide material is intimately mixed with said supercorroding metallic alloy powder.

8. The portable heating pack according to claim 1, wherein said oxide material is an oxide of at least one metal selected from copper, silver, manganese, nickel, zinc, cadmium, or mercury.

9. The portable heating pack according to claim 1 further comprising a high surface area carbon intimately mixed with said supercorroding alloy powder.

* * * * *